(12) United States Patent
Tsuda

(10) Patent No.: US 10,356,233 B2
(45) Date of Patent: Jul. 16, 2019

(54) DISPLAY PROCESSING APPARATUS

(71) Applicants: SONY CORPORATION, Tokyo (JP); SONY MOBILE COMMUNICATIONS INC., Tokyo (JP)

(72) Inventor: Takamoto Tsuda, Kanagawa (JP)

(73) Assignee: SONY CORPORATION, Tokyo (JP)

(*) Notice: Subject to any disclaimer, the term of this patent is extended or adjusted under 35 U.S.C. 154(b) by 161 days.

(21) Appl. No.: 15/161,820

(22) Filed: May 23, 2016

(65) Prior Publication Data
US 2016/0269525 A1 Sep. 15, 2016

Related U.S. Application Data

(63) Continuation of application No. 14/274,071, filed on May 9, 2014, which is a continuation of application (Continued)

(51) Int. Cl.
H04M 1/67 (2006.01)
H04M 1/725 (2006.01)
H04W 12/08 (2009.01)

(52) U.S. Cl.
CPC ......... H04M 1/67 (2013.01); H04M 1/72522 (2013.01); H04W 12/08 (2013.01); (Continued)

(58) Field of Classification Search
CPC .... H04M 1/67; H04M 1/725; H04M 2250/62; H04M 1/72552; H04M 1/72522; (Continued)

(56) References Cited

U.S. PATENT DOCUMENTS

2008/0220752 A1* 9/2008 Forstall ................. H04M 1/56
455/415
2009/0220752 A1 3/2009 Sugasaki
(Continued)

FOREIGN PATENT DOCUMENTS

EP 2343873 * 7/2011
EP 2343873 B1 7/2011
(Continued)

Primary Examiner — Matthew C Sams
(74) Attorney, Agent, or Firm — Xsensus LLP

(57) ABSTRACT

A mobile terminal apparatus including an operation lock mode setting unit that sets an operation lock mode; an event container display control unit that displays, when a predetermined event occurs, an event container indicating the occurred predetermined event on a display unit; an event container display change control unit that sets an event container between an active state and an inactive state; a lock canceling operation unit that cancels the operation lock mode; and a canceling operation handling control unit that, when an active-state event container is displayed on the display unit and the operation lock mode is canceled, performs automatic activation and display of an application program corresponding to the event of the active-state event container, and when all event containers on the display unit are in the inactive state and the operation lock mode is canceled, displays a predetermined display screen on the display unit.

7 Claims, 12 Drawing Sheets

Related U.S. Application Data

No. 13/283,216, filed on Oct. 27, 2011, now Pat. No. 8,761,730.

(60) Provisional application No. 61/443,532, filed on Feb. 16, 2011.

(52) U.S. Cl.
CPC .... *H04M 1/72552* (2013.01); *H04M 2250/22* (2013.01); *H04M 2250/62* (2013.01)

(58) Field of Classification Search
CPC .......... H04M 2250/22; H04M 2250/60; G06F 21/629; G06F 3/017; H04W 12/08
USPC ........... 455/410, 411, 414.1, 418, 550.1, 566
See application file for complete search history.

(56) References Cited

U.S. PATENT DOCUMENTS

| | | | |
|---|---|---|---|
| 2010/0146235 A1* | 6/2010 | Weber | G06Q 30/06 711/165 |
| 2010/0146437 A1* | 6/2010 | Woodcock | G06Q 30/06 715/806 |
| 2010/0159995 A1 | 6/2010 | Stallings et al. | |
| 2010/0306718 A1* | 12/2010 | Shim | G06F 3/04883 715/863 |
| 2011/0034208 A1* | 2/2011 | Gu | G06F 3/04883 455/550.1 |
| 2011/0037714 A1* | 2/2011 | Seo | G06F 3/0482 345/173 |
| 2011/0045813 A1* | 2/2011 | Choi | G06F 3/0219 455/418 |
| 2011/0294467 A1* | 12/2011 | Kim | G06F 1/1643 455/411 |
| 2012/0184247 A1 | 7/2012 | Choe et al. | |

FOREIGN PATENT DOCUMENTS

| | | | |
|---|---|---|---|
| EP | 2343873 B1 * | 8/2012 | ............ H04M 1/576 |
| JP | 9-62446 | 3/1997 | |

* cited by examiner

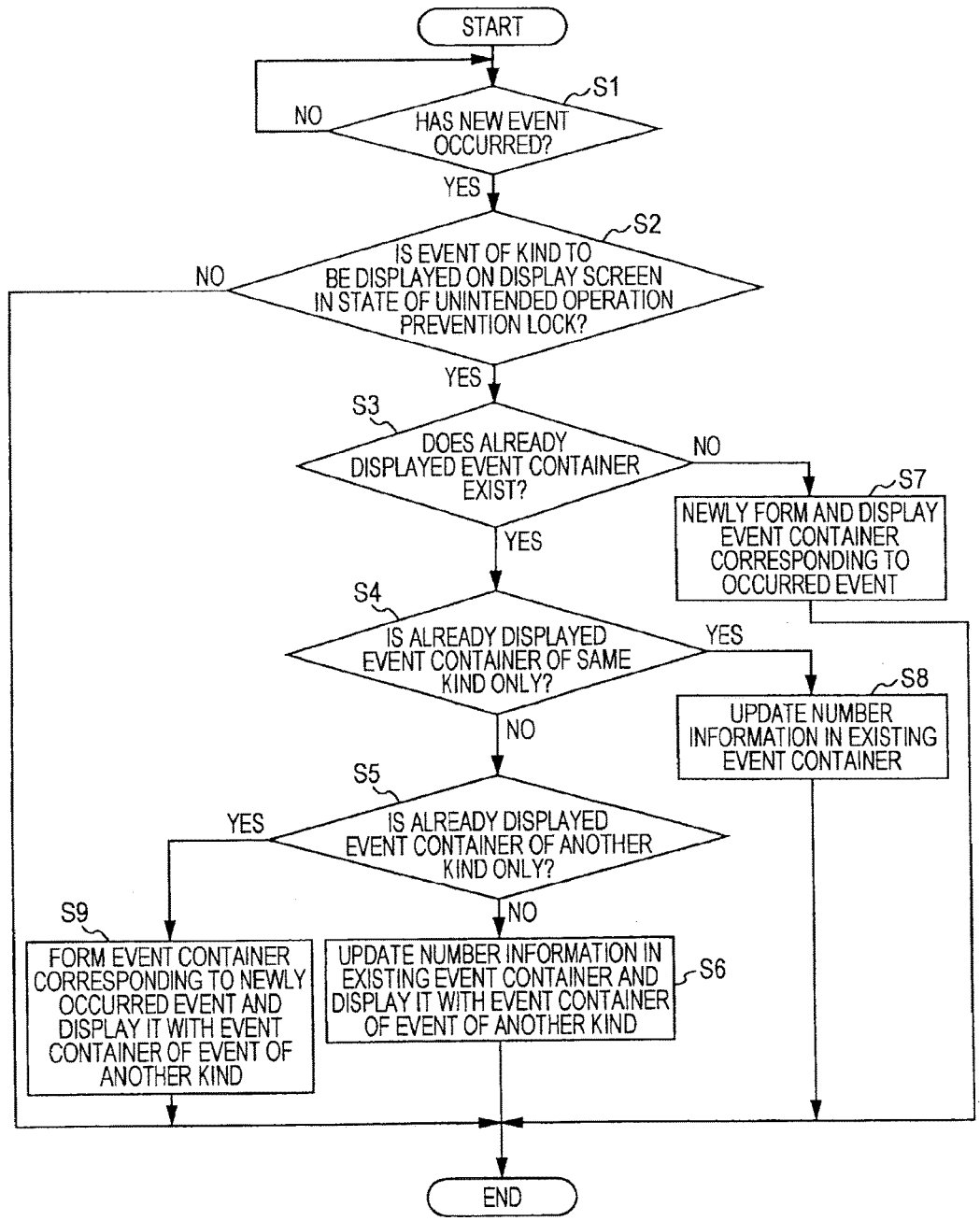

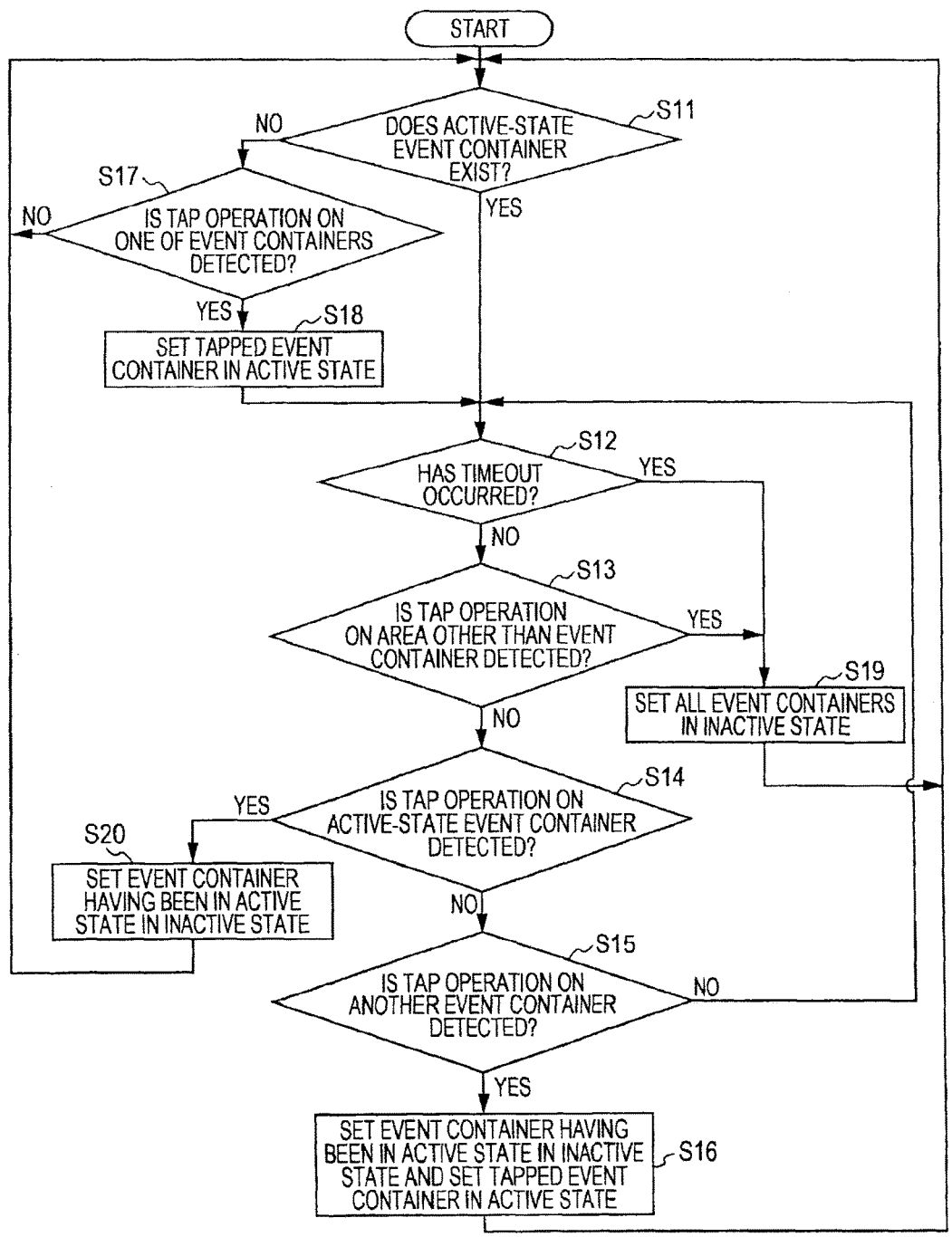

DISPLAY PROCESSING APPARATUS

CROSS REFERENCE TO RELATED APPLICATIONS

The present application is a continuation of and claims the benefit of priority under 35 U.S.C. § 120 to U.S. application Ser. No. 14/274,071, filed May 9, 2014, which is a continuation of U.S. application Ser. No. 13/283,216, filed Oct. 27, 2011, now U.S. Pat. No. 8,761,730, which is related to and claims priority under 35 U.S.C. § 119(e) to provisional Application No. 61/443,532, filed Feb. 16, 2011, the entire contents of each of which is hereby incorporated herein by reference.

BACKGROUND

1. Field

The present specification relates to display processing apparatuses suitably applied to electronic devices, such as, for example, a mobile phone, a PHS (PHS: Personal Handyphone System), a PDA (PDA: Personal Digital Assistant), a portable game machine, a music player, and a notebook personal computer.

More particularly, it relates to a display processing apparatus allowing users to intentionally select an action in a range of respecting the meaning of the existence of a screen lock mode with the screen lock for preventing unintended operations being set in the electronic devices.

2. Related Art

An applicant of the present specification has studied related arts and found existence of a technique disclosed in "Japanese Unexamined Patent Application Publication No. 09-062446" (Patent Literature 1).

This Patent Literature 1 discloses a touch panel input method intended to prevent unintended operations of operators.

More specifically, it is configured in this touch panel input method disclosed in Patent Literature 1 that, once an operator performs a touch operation on a touch panel displaying objects, such as characters and figures, with their finger or the like, the touch-operation performed object is determined on the basis of coordinates corresponding to the touch operation of the touch panel and event processing corresponding to the object is executed.

Additionally, it is configured in this touch panel input method disclosed in Patent Literature 1 that the event processing is executed only when the object at the time of touching of the finger in the touch operation and the object at the time of release of the finger in the touch operation are the same.

In this touch panel input method disclosed Patent Literature 1, when an operator mistakenly performs a touch operation on an object corresponding to an undesired event among objects displayed on the touch panel, the operator slides their finger to a position where no object exists or a display area of another object without leaving the finger from the touch panel to keep the contact and then leaves the finger from the touch panel. In this way, it is possible to cancel selection of the mistakenly operated object and prevent inconvenience of executing the undesired event.

Next, a mobile terminal device serving as art related to the present specification will be described.

This mobile terminal device has a display screen configured as a touch-operation performable touch panel. When this mobile terminal device shifts into a state where lock for preventing unintended operations is set (a screen lock mode), the mobile terminal device displays an unlock character (UNLOCK) and an arrow object (an unlock object) indicating an operation direction corresponding to an unlock operation at a lower area of the display screen as illustrated in FIG. 12(a).

These unlock character and unlock object mean that the screen lock is canceled in response to a slide operation (=an unlock operation) on the arrow object in the direction of the arrow and a free touch operation of the display screen is enabled.

That is, when this mobile terminal device shifts into the screen lock mode, the mobile terminal device is in a state of receiving only the unlock operation.

If an event, such as reception of a call or an email or notification of a schedule, then occurs with this screen lock mode being set, this mobile terminal device notifies users of the occurred event through the display screen.

FIG. 12(b) illustrates an example of the event notification at the time of reception of an email. As illustrated in this FIG. 12(b), when an email is received during the screen lock mode, this mobile terminal device displays an email reception message "An email is received from a user A (Text from User A)" and a subject attached to the email "Conference (conference)" on the display screen.

This display allows a user of the mobile terminal device to recognize reception of the email having the subject "Conference" from the user A without performing the above-described unlock operation.

After performing such event notification, the mobile terminal device determines whether predetermined time, such as, for example, 20 seconds, has passed since start of the event notification or not (determines whether timeout occurs or not.).

If the user performs the unlock operation before the timeout occurs, the mobile terminal device activates an application program for processing emails. On the basis of this email processing application program, the mobile terminal device then displays a list, such as a user name corresponding to the received email, on the display screen in an order of reception date and time as illustrated in FIG. 12(c).

When browsing an email received from a desired user from the displayed list of the user names or the like, the user of the mobile terminal device performs a touch operation on a part displaying the desired user name. In response to this touch operation, the mobile terminal device displays an email received from the touch-operation performed user on the display screen on the basis of the email processing application program. In this way, the user of the mobile terminal device can browse the desired email. On the other hand, when the mobile terminal device detects the unlock operation after the timeout, the mobile terminal device cancels the screen lock and displays, for example, a list of icons (a general menu) corresponding to respective application programs for selecting a desired application program on the display screen as illustrated in FIG. 12(d).

When browsing the received email, the user performs an operation for selecting an icon corresponding to the email processing application program from this list of icons.

Upon detecting the operation for selecting the icon corresponding to this email processing application program, the mobile terminal device activates the email processing application program. The mobile terminal device then displays a list, such as a user name corresponding to the received email, on the display screen in an order of reception date and time as illustrated in FIG. 12(c).

The user of the mobile terminal device performs a touch operation on a part displaying a desired user name from this displayed list of the user names or the like. In response to this touch operation, the mobile terminal device displays an email received from the touch-operation performed user on the display screen on the basis of the email processing application program. In this way, the user of the mobile terminal device can browse the desired email.

Actions of the mobile terminal device at the time of occurrence of an event during such a screen lock mode are summarized as follows:

1. When the unlock operation is performed before the timeout, the mobile terminal device activates an application program corresponding to the occurred event and performs processing of the occurred event.

2. When the unlock operation is performed after the timeout, the mobile terminal device cancels the screen lock and displays the general menu on the display screen. The mobile terminal device then activates an application program selected from this general menu.

CITATION LIST

[Patent Literature 1] Japanese Unexamined Patent Application Publication No. 09-062446

However, the above-described mobile terminal device has the following problems.

1. Users cannot select whether to automatically activate an application program corresponding to an occurred event or to simply cancel screen lock and display a general menu at the time of performing an unlock operation.

2. Users cannot know whether timeout has occurred or not. Accordingly, the users cannot predict whether the application program corresponding to the occurred event is activated or the general menu is displayed in response to the unlock operation.

That is, since the users cannot predict how the mobile terminal device acts in response to the unlock operation during the screen lock, there is a problem that it is difficult to perform an operation for intentionally selecting an action of the mobile terminal device during the screen lock.

Based on these, an inventor of this application recognizes the necessity of display processing apparatuses allowing users to perform an operation for intentionally selecting the action during the screen lock.

BRIEF SUMMARY

In accordance with an embodiment, a mobile terminal apparatus is provided that includes: a display unit; an operation lock mode setting unit that sets an operation lock mode which makes an operation inputted to the display unit, that is not one of one or more predetermined operations, an invalid operation; an event container display control unit that displays, when a predetermined event occurs and when the operation lock mode is set, an event container indicating the occurred predetermined event on the display unit; an event container display change control unit that sets an event container to an active state from an inactive state or from an active state to an inactive state; a lock canceling operation unit that performs an operation for canceling the operation lock mode; and a canceling operation handling control unit that, when the canceling operation through the lock canceling operation unit is performed when the operation lock mode is set and when an active-state event container is displayed on the display unit, cancels the operation lock mode and performs automatic activation and display of an application program corresponding to the event of the active-state event container from a memory storing the application program, and when the canceling operation through the lock canceling operation unit is performed when the operation lock mode is set and when all event containers on the display unit are in the inactive state, cancels the operation lock mode and displays a predetermined display screen on the display unit.

Additionally, in accordance with one embodiment, a display processing method is provided that includes: setting, by a mobile terminal apparatus, an operation lock mode which makes an operation inputted to a display unit, that is not one of one or more predetermined operations, an invalid operation; displaying, by the mobile terminal apparatus, when a predetermined event occurs and when the operation lock mode is set, an event container indicating the occurred predetermined event on the display unit; setting an event container to an active state from an inactive state or from an active state to an inactive state; canceling the operation lock mode; and when the operation lock mode is canceled and when an active-state event container is displayed on the display unit, performing automatic activation and display of an application program corresponding to the event of the active-state event container from a memory storing the application program, and when the operation lock mode is canceled and when all event containers on the display unit are in the inactive state, displaying a predetermined display screen on the display unit.

In addition, in accordance with one embodiment, a computer readable storage medium including computer executable instructions is provided, wherein the instructions, when executed by a mobile terminal apparatus, cause the mobile terminal apparatus to perform a method comprising: setting an operation lock mode which makes an operation inputted to a display unit, that is not one of one or more predetermined operations, an invalid operation; displaying, when a predetermined event occurs and when the operation lock mode is set, an event container indicating the occurred predetermined event on the display unit; setting an event container to an active state from an inactive state or from an active state to an inactive state; canceling the operation lock mode; and when the operation lock mode is canceled and when an active-state event container is displayed on the display unit, performing automatic activation and display of an application program corresponding to the event of the active-state event container from a memory storing the application program, and when the operation lock mode is canceled and when all event containers on the display unit are in the inactive state, displaying a predetermined display screen on the display unit.

In such embodiments, when the operation for putting the event container in the active state is performed during the operation lock mode, the preview object displaying the partial information of the event corresponding to the event container is formed and this preview object is displayed as the active-state event container on the display unit.

In this way, it is possible to display only the partial information (=the above-described preview object) corresponding to the occurred event while respecting the operation lock mode.

Additionally, in one embodiment, an action for each operation is defined in a following manner.

1. When the event container of the event occurred during the operation lock mode is operated, only the partial information of the occurred event is displayed as the preview object on the display unit while respecting that the operation lock mode is not canceled.

2. When the lock canceling operation is performed during the operation lock mode with the active-state event container being displayed, the operation lock is canceled, the application program corresponding to the event of the active-state event container is activated, and the processing of the event is performed.

3. When the lock canceling operation is performed during the operation lock mode with all event containers being in the inactive state, the operation lock mode is canceled and the predetermined display screen is displayed on the display unit.

As described above, in one embodiment, the action for each operation during the operation lock mode is clearly defined. Accordingly, users can perform an operation for intentionally selecting the action during the operation lock mode.

One embodiment allows users to perform the operation for intentionally selecting the action during the operation lock mode.

Additionally, one embodiment forms, when the event container is put in the active state during the operation lock mode, the preview object displaying only the partial information of the event and displays this on the display unit. Accordingly, it is possible to prevent inconvenience of displaying entire information of the event without the operation lock mode being canceled. Thus, it is possible to perform displaying of information in a form of respecting the meaning of the existence of the operation lock mode.

BRIEF DESCRIPTION OF THE DRAWINGS

FIG. 4 is a diagram illustrating a flow of display control of an event container at the time of occurrence of an event in the mobile phone serving as the embodiment.

FIG. 6 is a flowchart for describing an operation for putting a displayed event container in an active state or an inactive state during a screen lock mode of the mobile phone serving as the embodiment.

DETAILED DESCRIPTION

The present embodiments can be applied to mobile phones, for example.

[Configuration of Mobile Phone]

Figure 1:
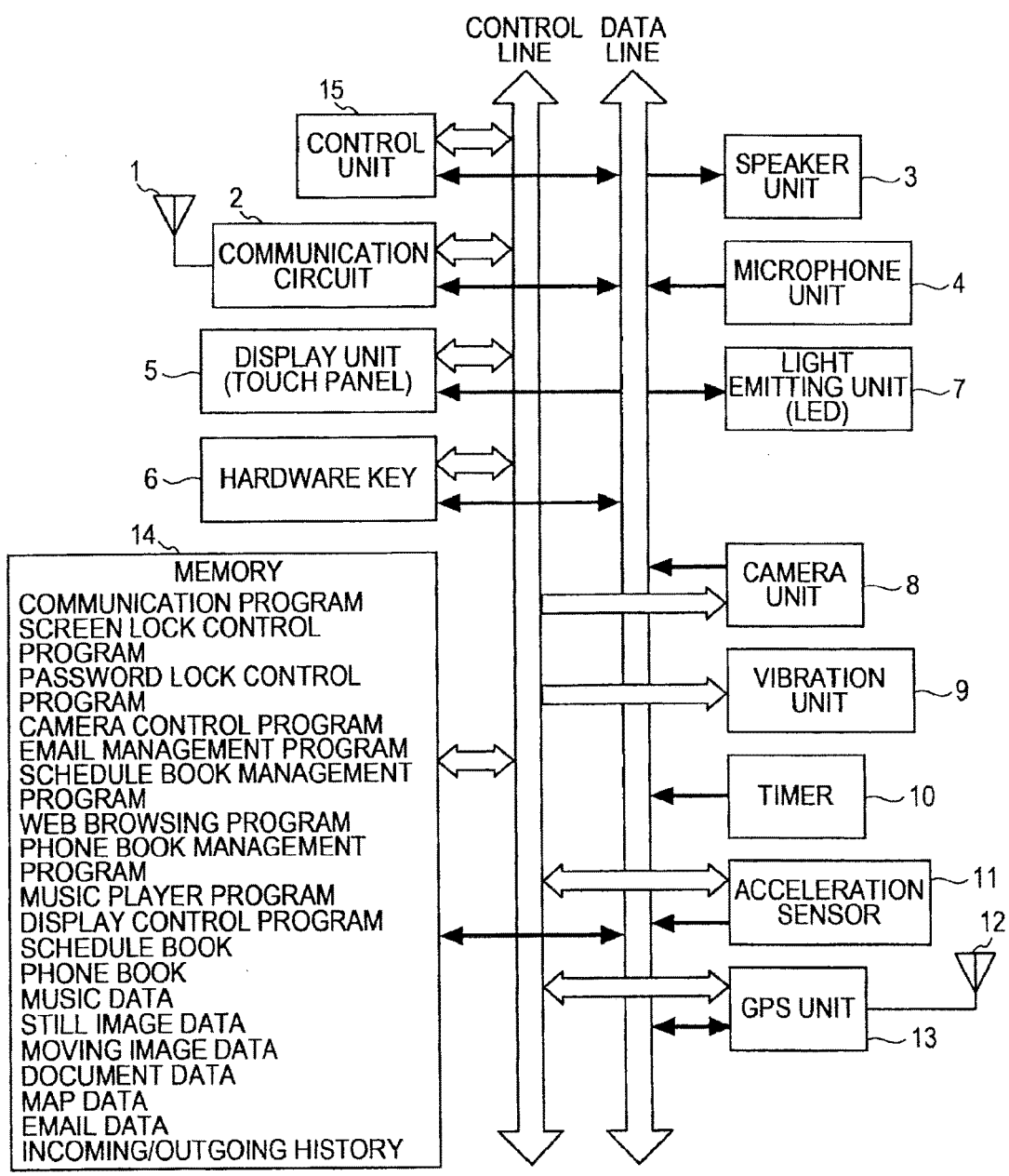
FIG. 1 is a block diagram of a mobile phone serving as an embodiment.
Figure 2A:
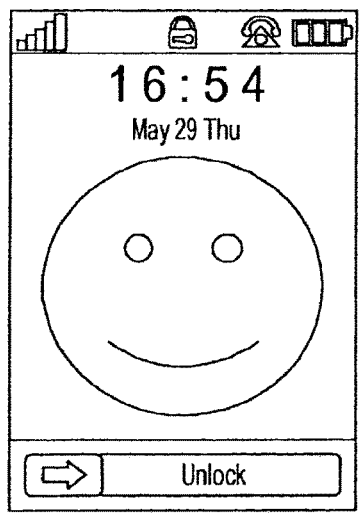
FIGS. 2A, 2B, 2C, and 2D are diagrams illustrating display examples of an event container of the mobile phone serving as the embodiment.
Figure 2B:
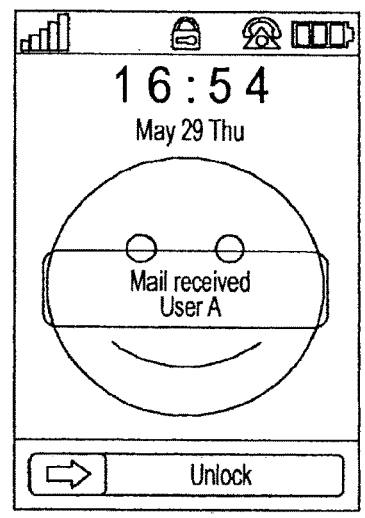
Figure 2C:
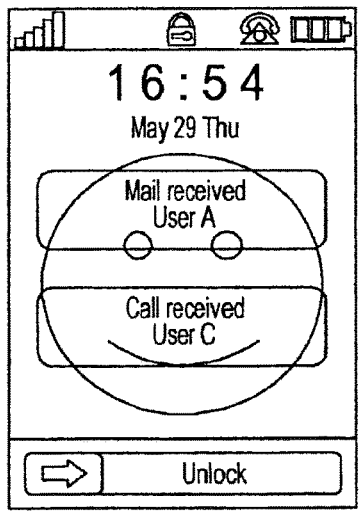
Figure 2D:
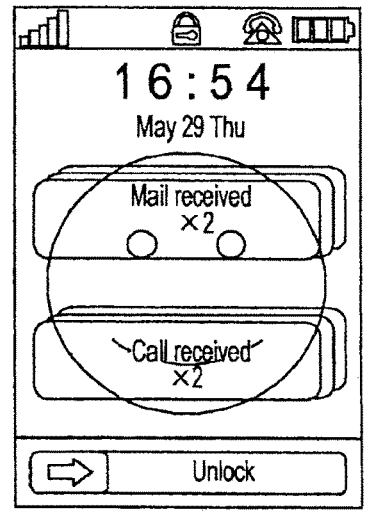

FIG. 1 is a block diagram illustrating a schematic electrical configuration of a mobile phone serving as an embodiment. As illustrated in this FIG. 1, the mobile phone serving as this embodiment includes an antenna 1 and a communication circuit 2 that perform radio communication of voice calls, videophone calls, emails, Web data (Web: World Wide Web), and so on with base stations.

This mobile phone also includes a call audio speaker unit 3 for acquiring audio output, such as audio of incoming calls, and a microphone unit 4 for collecting sound, such as audio of outgoing calls.

Additionally, this mobile phone includes a display unit 5, configured as a so-called touch panel, enabling touch operations with a finger of users or the like. This display unit 5 is configured to display operation menus, emails, and images (still images and moving images). Additionally, this display unit 5 is configured to display operation keys, such as numeral keys, an enter key, an on-hook key, an off-hook key.

In addition, this display unit 5 is configured to display an event container for notifying users of occurrence of an event, such as, for example, reception of a call, reception of an email, or notification of schedule execution start time.

A control unit 15 to be described later detects an operation key or an object subjected to a touch operation by users from the respective operation keys and the objects, such as the event containers, displayed on the display unit 5. For this detected operation key or object, the control unit 18 then performs, for example, transmission processing of a call or an email, display processing corresponding to the event container, and so on.

Next, in addition to each key (=software key) displayed on the display unit 5 on the basis of a software program, this mobile phone includes a hardware key 6 physically provided at a predetermined position of a casing of the mobile phone. For example, in a case of the mobile phone, a power-on/off key for turning on main power of the mobile phone, a camera activation switch for activating a camera unit, and so on are provided as this hardware key 6.

Additionally, in the case of the mobile phone, an event container operation key for performing an operation for selecting the event container or the like is provided as the hardware key 6. Meanwhile, although the description will be given with an assumption that the event container operation key is provided as the hardware key 6 in the mobile phone in this example, this event container operation key may be provided as a software key displayed on the display unit 5.

By providing the event container operation key as the software key, it is possible to decrease the number of hardware keys provided in the casing of the mobile phone and to achieve downsizing of the casing, improvement of design of the casing, and reduction in production cost owing to a decrease in the number of components.

Next, this mobile phone includes a light emitting unit 7 (LED: Light Emitting Diode) for notifying users of occurrence of an event, such as transmission and reception of a call or an email, with light, a camera unit 8 for shooting still images or moving images of a desired subject, a vibration unit 9 for notifying users of transmission and reception or the like by vibrating the casing of the mobile phone, and a timer 10 counting the current time.

Additionally, this mobile phone includes a contactless radio communication antenna 12 and a contactless IC unit 13 for performing contactless radio communication of a communication distance of, for example, appropriately 50 cm, and a near field radio communication antenna 14 and a near field radio communication unit 15 for performing near field radio communication of a communication distance of, for example, appropriately 10 m.

This mobile phone also includes an acceleration sensor 11 for detecting shaking applied to the mobile phone, a GPS antenna 12 and a GPS unit 13 that detect a current location of the mobile phone.

In addition, this mobile phone includes a memory 14 storing a communication program for performing radio communication processing through the base stations, various application programs, and various kinds of data or the like handled in these various application programs and the control unit 15 for controlling actions of the entire mobile phone.

In addition to the communication program, the memory 14 stores a screen lock control program for preventing unintended operations. Although the description will be given later, once a user sets screen lock, the control unit controls the display unit 5 on the basis of this screen lock control program so that touch operations, except for a screen lock unlock operation and an operation of the event container, are not accepted until the screen lock is canceled.

Additionally, the memory 14 stores a camera control program for controlling shooting of the camera unit 8. This camera control program also has a viewer function for shot still images and moving images.

The memory 14 also stores an email management program for controlling creation, transmission, and reception of emails and a schedule book management program for performing management of a schedule book in which a schedule of a user is registered.

Additionally, the memory 14 stores a web browsing program for performing browsing of web pages or the like by accessing a server apparatus provided in a predetermined network, such as a communication network or the Internet, and performing transmission and reception of information, a phone book management program for performing management of a phone book, and a music player program for performing reproduction of music data.

The memory 14 also includes a schedule book (i.e., a registration area of schedule data) in which a desired schedule of a user is registered and a phone book (i.e., a registration area of personal information of each user) in which user names, still images (face photos or the like), addresses, phone numbers, email addresses, birthdays, and so on of acquaintances and friends of the user are registered. In addition, the memory 14 stores music data reproduced on the basis of the music player program, still image data and moving image data reproduced on the basis of the viewer function of the camera control program, and data of transmitted and received emails, a history of outgoing and incoming calls and emails, and so on.

[Password Lock Mode and Screen Lock Mode]

The mobile phone of this embodiment has, as modes for restricting (locking) operations of the mobile phone, a "password lock mode" performing user authentication on the basis of a password and allowing only a valid user to operate the mobile phone and a "screen lock mode" invalidating touch operations other than a predetermined touch operation after a predetermined lock operation is performed until a predetermined unlock operation is performed.

When setting the mobile phone in the password lock mode, a user performs setting of a desired password and then performs an operation for shifting into the password lock mode. If this shifting operation is performed, the control unit 15 shifts into the password lock mode on the basis of a password lock control program stored in the memory 14 and displays a password input screen on the display unit 5 upon detecting a touch operation on the display unit 5 or a hardware key pressing operation.

The user performs an operation for inputting the set password on this password input screen. The control unit 15 compares the password input by this user with the set password stored in the memory 14, thereby performing user authentication. If both of the passwords match, the control unit 15 authenticates the user having performed input of the password as a valid user of the mobile phone and cancels the password lock. After canceling of this password lock, the user can freely operate the mobile phone.

Such an operation requiring input of the password is the same at the time of occurrence of an event. For example, when a mail is received, the control unit 15 displays an event container serving as an object for notifying the user of reception of this mail on the display unit 5.

To display the received mail, the user performs a touch operation on this mail event container. Upon detecting the touch operation on the mail event container, the control unit 15 displays the above-described password input screen on the display unit 5. If the password indicating that the user is the valid user through this password input screen, the control unit 15 activates the email management program corresponding to the touch-operation performed event container from the memory 14 and displays the received mail on the display unit 5 on the basis of this email management program.

Such a password lock mode is an operation lock mode intended to prevent invalid operations by a third party other than a true user. Accordingly, the password lock mode is an operation lock mode in which substantially no operation is accepted and output of information, such as displaying of a mail, is not performed unless the password indicating that the user is the valid user is input.

In contrast, the screen lock mode is an operation lock mode intended to prevent unintended operations at the time of carrying the mobile phone having the display unit 5 configured as a touch-operation performable touch panel. Accordingly, the mobile phone of the embodiment accepts operations to some extent and performs output of information to some extent within a range not departing from the concept of preventing the unintended operations as described below.

Each of such password lock and screen lock can be set alone. Additionally, setting can be made so that both of the password lock and the screen lock are used.

Among these, an action of the mobile phone in a case where the screen lock alone is set will be described later. Additionally, an action of the mobile phone in a case where the password lock alone is set is as described above.

Additionally, an action of the mobile phone in a case where the setting is made so that both of the password lock and the screen lock are used is similar to the action in the case where the password lock alone is set. More specifically, when the setting is made so that both of the password lock and the screen lock are used, the control unit displays the password input screen on the display unit 5 upon detecting a touch operation of the display unit 5 or detecting an operation of the hardware key 6. Only when the password indicating that the user is the valid user is input through this input screen, the control unit 15 performs information processing corresponding to the touch operation of the display unit 5 or the operation of the hardware key 6.

[Operation During Screen Lock Mode]

An action of the mobile phone of the embodiment in a case where the screen lock mode alone, among the above-described password lock and screen lock, is set by a user will be described below.

For example, if the hardware key 6 for screen lock is operated or a touch operation for the screen lock is performed through the display unit 5, the control unit 15 shifts into the screen lock mode on the basis of the screen lock control program stored in the memory 14. After shifting into this screen lock mode, the control unit 15 displays an unlock character (UNLOCK) and an arrow object (an unlock object) indicating an operation direction corresponding to an unlock operation at a lower area of a display screen of the display unit 5 as illustrated in FIG. 2(*a*).

These unlock character and unlock object mean that, if the user performs a slide operation (=an unlock operation) on the arrow unlock object in the direction of the arrow, the screen lock is canceled and the user can freely perform touch operations on the display screen.

Figure 3:
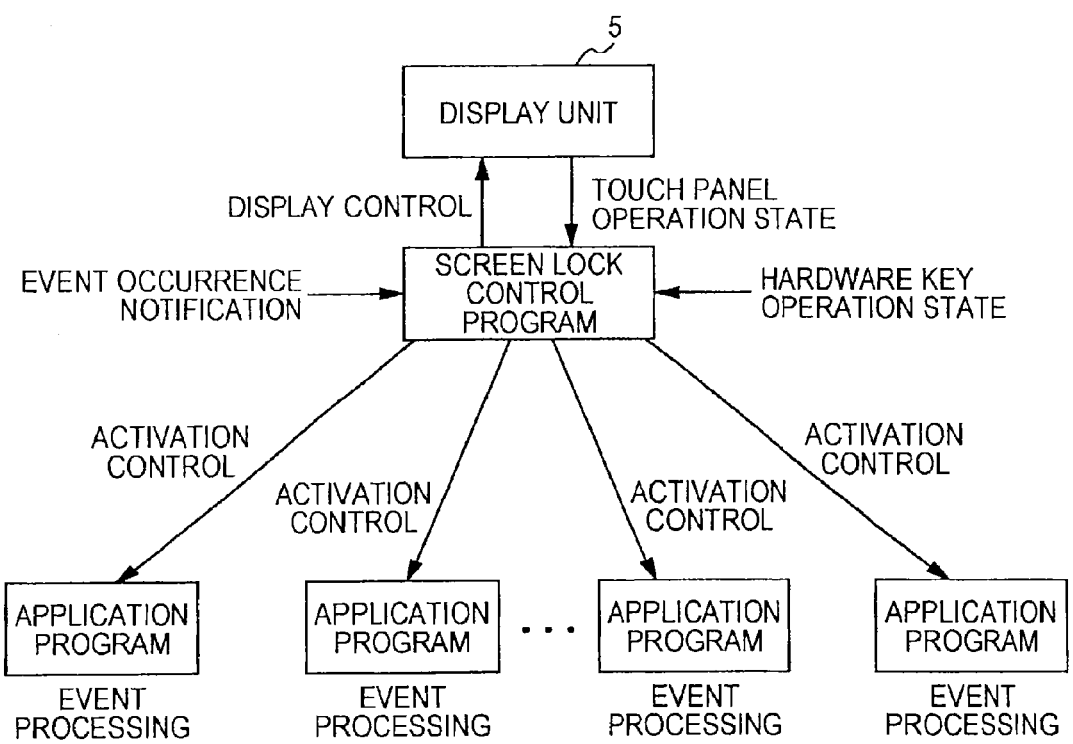
FIG. 3 is a diagram for describing a schematic action position of a screen lock control program provided in the mobile phone serving as the embodiment.

The control unit 15 of the mobile phone of the embodiment controls execution of an action during this screen lock mode on the basis of the screen lock control program. FIG. 3 illustrates a schematic positional relationship of this screen lock control program. As illustrated in this FIG. 3, the screen lock control program is positioned as a role of mediating between respective application programs and controls activation of an application program corresponding to the touch operation of the display unit 5 or the operation of the hardware key 6.

A flowchart of FIG. 4 illustrates a flow of the action of the mobile phone during the screen lock mode. Once the user performs an operation for setting the screen lock mode, the control unit 15 of the mobile phone starts processing illustrated in this flowchart of FIG. 4 on the basis of the screen lock control program stored in the memory 14.

First, in STEP S1, the control unit 15 monitors presence or absence of occurrence of an event, such as, for example, reception of a call, reception of a mail, or notification of schedule execution start time. More specifically, for example, when a call or a mail is received, the control unit 15 is notified of reception of the call or the mail on the basis of the communication program or the email management program. Additionally, when the current time measured by the timer 10 becomes the schedule execution start time, the control unit 15 is notified of the schedule execution start time on the basis of the schedule book management program. The control unit 15 monitors presence or absence of such a notification in STEP S1. Once the control unit detects occurrence of the event, the process proceeds to STEP S2.

In STEP S2, the control unit 15 determines whether the event (a new event) detected in STEP S1 is an event of a kind to be displayed on the display unit 5 during this screen lock mode or not. Upon determining that the event detected in STEP S1 is not the event of the kind to be displayed on the display unit 5 during this screen lock mode, the control unit 15 terminates the processing illustrated in this flowchart of FIG. 4 without displaying anything on the display unit 5.

In contrast, if the control unit 15 determines that the event detected in STEP S1 is the event of the kind to be displayed on the display unit 5 during this screen lock mode, the process proceeds to STEP S3.

In STEP S3, the control unit 15 determines whether an event has occurred before detecting the new event in STEP S1 and an event container corresponding to this event having occurred in the past is already displayed on the display unit 5 or not. If the control unit 15 determines that the event container corresponding to the event having occurred in the past is already displayed on the display unit 5, the process proceeds to STEP S4. If the control unit determines that the event container corresponding to the event having occurred in the past is not displayed on the display unit 5, the process proceeds to STEP S7.

More specifically, for example, when reception of a mail is detected as the new event in STEP S1 but there is reception of a call before this mail reception and an event container corresponding to this call reception is displayed on the display unit 5, the control unit 15 determines that the event container corresponding to the event having occurred in the past is already displayed on the display unit 5 and the process proceeds to STEP S4.

Similarly, for example, when reception of a call is detected as the new event in STEP S1 but notification of schedule start time is made before this call reception and an event container corresponding to this notification of the schedule start time is displayed on the display unit, the control unit 15 determines that the event container corresponding to the event having occurred in the past is already displayed on the display unit 5 and the process proceeds to STEP S4.

In contrast, for example, when the control unit 15 detects reception of a mail as the new event in STEP S1 but no event has occurred before this mail reception and no event container is displayed on the display unit 5, the process proceeds to STEP S7.

If the process proceeds to STEP S7 because it is determined that the event container corresponding to the event having occurred in the past is not displayed on the display unit 5, the control unit 15 forms an event container corresponding to the new event detected in STEP S1, controls displaying of this on the display unit 5, and terminates the processing illustrated in this flowchart of FIG. 4.

FIG. 2(*b*) illustrates a display example of an event container in a case where only a single event of reception of an email, for example, occurs. As illustrated in this FIG. 2(*b*), once the email reception event occurs, the control unit 15 refers to the phone book stored in the memory 14 on the basis of an email address of a user serving as a transmission source of the received email.

In this phone book, personal information, such as a user name (nickname), an address, an email address, a phone number, and a face photo, is registered for each user. The control unit 15 refers to this phone book on the basis of the email address of the user serving as the transmission source of the received email, thereby detecting a user name of the user serving as the transmission source of the received email.

The control unit 15 then forms an event container displaying a reception message "Mail received" and the user name of the user serving as the transmission source of the email detected from the phone book for, for example, a substantially rectangular object and controls displaying of this on the display unit 5.

Meanwhile, when the email address of the user serving as the transmission source of the received email is not registered in the phone book, the control unit 15 controls displaying of an event container displaying the reception message and the email address of the user serving as the transmission source of the received email instead of the user name on the display unit 5.

On the other hand, if the process proceeds to STEP S4 because it is determined that the event container corresponding to the event having occurred in the past is displayed on the display unit 5, the control unit 15 determines whether only an event container of an event of the same kind as the new event detected in STEP S1 is displayed on the display unit 5 or not.

If the control unit 15 determines that only the event container of the event of the same kind as the new event detected in STEP S1 is displayed on the display unit 5, the process proceeds to STEP S8. If the control unit determines that only the event container of the event of a kind different from the new event detected in STEP S1 is displayed on the display unit 5 and if the control unit determines that an event container of an event of a kind different from the new event detected in STEP S1 is displayed on the display unit 5 with an event container of an event of the same kind as the new event detected in STEP S1, the process proceeds to STEP S5.

If the process proceeds to STEP S8 because it is determined that only the event container of the event of the same kind as the new event detected in STEP S1 is displayed on the display unit 5, the control unit 15 increments information on the number of already displayed event containers by "1" for the new event having occurred this time and displays a total number of occurrence of the event.

More specifically, when the numbers of call and email reception events are equal to 2 or more, for example, the control unit 15 forms an event container in a shape that a plurality of event containers overlap and displays the reception message and the number of reception events (the number information) for this event container as illustrated in FIG. 2(*d*). A character "×2" illustrated in this FIG. 2(*d*) means that two email receptions or two call reception events have occurred.

Additionally, FIG. 2(*c*) illustrates a display example of each event container in a case where an email reception event and a call reception event are detected. As illustrated in this FIG. 2(*c*), if an email reception event occurs, the control unit 15 forms an event container displaying the reception message and the user name of the user serving as the transmission source and controls displaying of this on the display unit 5 as described above.

Additionally, if a call reception event occurs, the control unit 15 refers to the phone book stored in the memory 14 on the basis of a phone number of a user serving as a transmission source notified at the time of reception of the call to detect a user name of the user serving as the transmission source of the received call.

The control unit 15 then forms an event container displaying a reception message "Call received" and the user name of the user serving as the transmission source of the call detected from the phone book for, for example, a substantially rectangular object and controls displaying of this on the display unit 5 as illustrated in FIG. 2(*c*).

Meanwhile, when the phone number of the call notified at the time of reception is not registered in the phone book, the control unit 15 controls displaying of an event container displaying the reception message and the notified phone number as it is instead of the user name on the display unit 5.

Next, if the process proceeds to STEP S5 because it is determined in STEP S4 that the event container of the event of the kind different from the new event detected in STEP S1 is displayed on the display unit 5 with the event container of the event of the same kind as the new event detected in STEP S1, the control unit 15 determines whether the event container already displayed is only an event container of an event of a kind different from the new event or not.

If the control unit 15 determines that the already displayed event container is only the event container of the event of the kind different from the new event, the process proceeds to STEP S9. If the control unit determines that the event container of the event of the same kind as the new event is displayed with the event container of the event of the kind different from the new event as the already displayed event containers, the process proceeds to STEP S6.

If the process proceeds to STEP S9 because it is determined that the already displayed event container is only the event container of the event of the kind different from the new event, the control unit 15 newly forms an event container corresponding to the new event, displays this with the already displayed event container, and terminates the processing illustrated in this flowchart of FIG. 4.

Additionally, if the process proceeds to STEP S6 because it is determined that the event container of the event of the same kind as the new event is displayed with the event container of the event of the kind different from the new event as the already displayed event containers, the control unit 15 performs processing for updating the number information in the existing event container, displays this on the display unit 5 with the event container of the event of the other kind, and terminates the processing illustrated in this flowchart of FIG. 4.

Figure 5A:
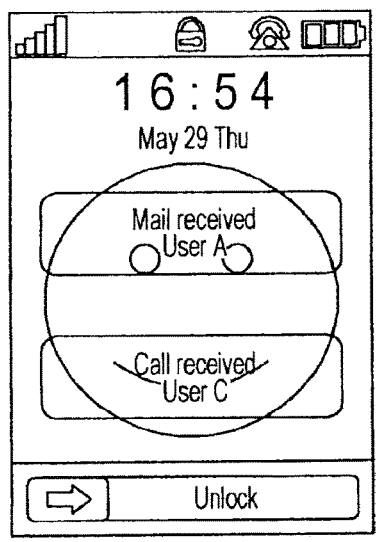
FIGS. 5A and 5B are diagrams for describing a different between ways of displaying a single event container and a plurality of event containers in the mobile phone serving as the embodiment.
Figure 5B:
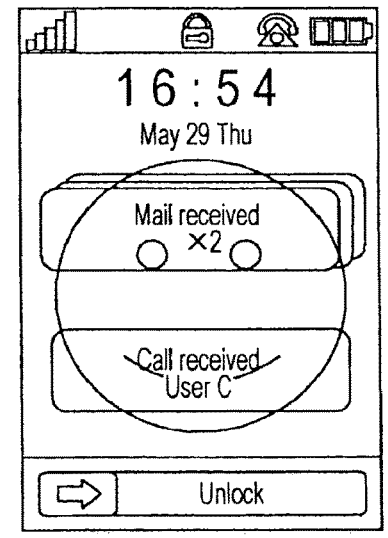

More specifically, for example, in a case an event container corresponding to an email reception event and an event container corresponding to a call reception event are already displayed on the display unit 5 as illustrated in FIG. 5(*a*) when a new event of an email occurs, the control unit 15 performs the processing for updating the number information of the already displayed event container of the email reception event to, for example, the number information "×2" as illustrated in FIG. 5(*b*). The control unit 15 then controls displaying of the event container of this email reception event having the updated number information on the display unit 5 with the event container of the call reception event.

[Event Container Display Change Action through Tap Operation]

Next, the mobile phone of the embodiment is configured to put, if a user performs a tap operation on a desired event container among event containers displayed on the display unit 5, the event container in an active state and display only partial content of the event.

A flowchart of FIG. 6 illustrates a flow of an action of the mobile phone at the time of such an event container tap operation. After displaying an event container on the display unit 5, the control unit 15 starts processing of this flowchart of FIG. 6 on the basis of the screen lock control program stored in the memory 14.

In STEP S11, the control unit 15 determines whether an active-state event container, to be described later, exists among the event containers currently displayed on the display unit 5 or not. If the control unit 15 determines that the active-state event container exists among the event containers currently displayed on the display unit 5, the process proceeds to STEP S12. Additionally, if the control unit 15 determines that the active-state event container does not exist among the event containers currently displayed on the display unit 5, the process proceeds to STEP S17.

If the process proceeds STEP S17 because it is determined that the active-state event container does not exist among the event containers currently displayed on the display unit 5, the control unit 15 monitors presence or absence of a touch operation (a tap operation) on one of the event containers. If the control unit 15 detects the tap operation on one of the event containers, the process proceeds to STEP S18 at that time. The control unit controls displaying of the tap-operation performed event container on the display unit 5 as an active-state event container and the process then proceeds to STEP S12.

Next, in STEP S12, the control unit 15 determines whether predetermined time, such as, for example, one minute, has passed or not since one of the event containers currently displayed on the display unit 5 is put in the active state. This STEP S12 is a step in which the control unit 15 monitors presence or absence of so-called timeout.

If the predetermined time has passed without any operation by the user since the control unit 15 puts one of the event containers in the active state, the process proceeds to STEP S19 from STEP S12. The control unit 15 returns all of the event containers displayed on the display unit 5 to an inactive state (a deactivated state) and the process returns to STEP S11.

In contrast, if it is determined in STEP S12 that the timeout has not occurred, the process proceeds to STEP S13 and the control unit 15 determines presence or absence of a tap operation on a display area other than those displaying the event containers among the entire display area of the display unit 5.

The mobile phone is configured to return all of the event containers to the inactive state in response to a tap operation on the display area other than the display areas of the event containers when one of the event containers is in the active state. Accordingly, if the control unit 15 detects the tap operation on the display area other than the event containers in STEP S13, the process proceeds to STEP S19 and the control unit returns all of the event containers displayed on the display unit 5 to the inactive state (the deactivated state). The process returns to STEP S11.

Next, if it is determined that the timeout has not occurred in STEP S12 and it is determined that there is no tap operation on the display area other than the display areas displaying the event containers in STEP S13, the process proceeds to STEP S14. The control unit 15 determines whether a tap operation is performed on the event container currently in the active state or not.

If the tap operation on the event container currently in the active state is detected in STEP S14, the process proceeds to STEP S20. The control unit 15 returns the tap-operation performed event container (=the event container having been in the active state up to that point) to the inactive state. The process returns to STEP S11.

In contrast, if the tap operation on the event container currently in the active state is not detected in STEP S14, the process proceeds to STEP S15. The control unit 15 determines whether a tap operation is performed on one of the event containers currently in the inactive state, i.e., the event container other than the active-state event container, or not.

If the control unit 15 does not detect the tap operation on the event container currently in the inactive state in this STEP S15, the process returns to STEP S12. Additionally, if the control unit 15 detects the tap operation on one of the event containers currently in the inactive sate, the process proceeds to STEP S16.

In STEP S16, the control unit 15 puts the event container having been in the active state up to that point in the inactive state and puts the event container regarding which the tap operation is detected in STEP S15 in the active state. The process then returns to STEP S1.

Such an event container display change action through a tap operation will be described again with a concrete example.

Figure 7A:
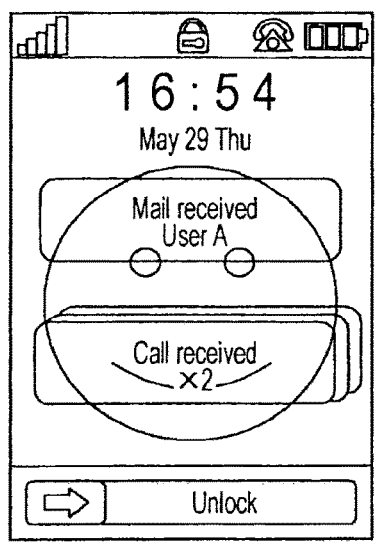
FIGS. 7A, 7B, and 7C are diagrams for describing display examples of event containers displayed in the active state during the screen lock mode of the mobile phone serving as the embodiment.
Figure 7B:
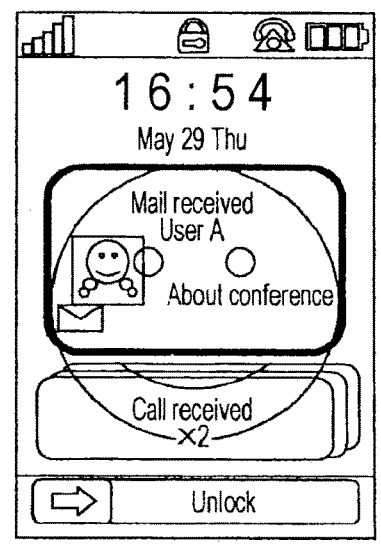

First, if a user performs a tap operation on an event container of an email reception event, for example, in a case where all of event containers are in the inactive state as illustrated in FIG. 7(a), the control unit 15 controls displaying of this tap-operation performed event container of the email reception event as an active-state event container on the display unit 5 as illustrated in FIG. 7(b).

More specifically, upon detecting the tap operation on the inactive-state event container of the email reception event, the control unit 15 acquires a user name and a face photo of a user of a transmission source of the email with reference to the phone book on the basis of a mail address of this email.

The control unit 15 also acquires data of a subject, such as, for example, "About conference", from data of the email stored in the memory 14. The control unit then forms a preview object serving as the active-state event container that is larger than the inactive-state event container. The control unit displays, in this preview object, a reception message, such as, for example, "Mail received", the user name, such as "User A" of the user of the transmission source of the email acquired from the phone book, the face photo of the user of the transmission source of the email acquired from the phone book, a small image of a sealed letter representing an email, and the subject, such as "About conference", acquired from the data of the email stored in the memory 14. The control unit then displays this preview object serving as the active-state event container on the display unit 5 as illustrated in FIG. 7(b).

That is, a tap operation performed on one of event containers when each event container is in the inactive state means that a request for displaying event information corresponding to the tap-operation performed event container is made by the user.

However, as described above, the mobile phone is currently in the screen lock mode for preventing unintended operations at the time of carrying and an unlock operation for canceling the screen lock mode is not performed. Accordingly, even if the request for displaying the event information corresponding to the event container is made from the user through the tap operation, displaying the entire event information is not preferable because the screen lock mode is set.

On the other hand, when the request for displaying the event information corresponding to the event container is made from the user through the tap operation, displaying the content based on recognition regarding this screen lock mode is preferable and also leads to improvement of usability of the mobile phone.

Figure 7C:
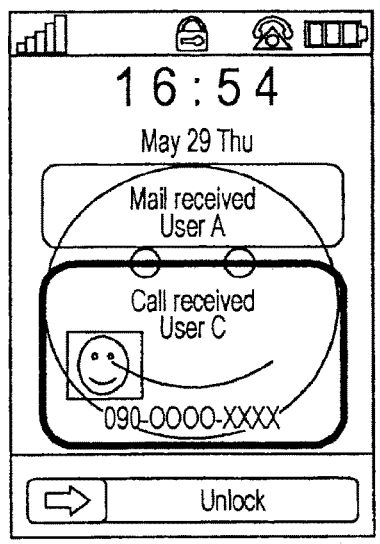

Based on these, upon detecting a tap operation on an inactive-state event container during the screen lock mode, the control unit 15 sets the event container as the active-state event container and displays partial content of the event in this active-state event container as illustrated in FIG. 7(*b*) (STEP S16 and STEP S18). In this way, it is possible to perform displaying of minimum information corresponding to the display request of the user while respecting that the mobile phone is currently in the screen lock mode and to achieve improvement of usability of the mobile phone.

Next, a tap operation performed on a display area other than this event container with the active-state event container being displayed like the email event container illustrated in FIG. 7(*b*) means that a request for putting all of the event containers in the inactive state is made by the user.

Accordingly, upon detecting the tap operation on the display area other than the event container in STEP S13 of the flowchart of FIG. 6, the control unit 15 controls displaying of all of the event containers in the inactive state in STEP S19 as illustrated in FIG. 7(*a*). In this way, all of the event containers return to the inactive state if the user performs the tap operation on the area other than the event containers with the active-state event container being displayed.

Next, a tap operation performed by the user on this active-state event container with the active-state event container being displayed means that a request for returning the state of this tap-operation performed event container from the active state to the inactive state is made from the user.

Accordingly, if the user performs the tap operation on the active-state event container like the email event container illustrated in FIG. 7(*b*), the control unit 15 returns the state of this tap-operation performed event container to the inactive state and controls displaying of it on the display unit 5 in STEP S20 of the flowchart of FIG. 6 as illustrated in FIG. 7(*a*).

Next, a tap operation performed by the user on an inactive-state event container with the active-state event container being displayed means that a request for putting this tap-operation performed event container in the active state from the inactive state is made from the user.

Accordingly, upon detecting the tap operation on the inactive-state event container of a call reception event with the active-state event container like the email event container illustrated in FIG. 7(*b*) existing, the control unit 15 returns and displays the event container of the email reception event having been displayed as the active state up to that point back to the inactive state and also displays the event container of the call reception event having been displayed as the inactive state up to that point in the active state in STEP S16 of the flowchart of FIG. 6 as illustrated in FIG. 7(*c*). In this way, the user can select an event container displayed in the active state through a tap operation.

[Operation for Selecting Desired Action at Timing of Unlock Operation]

Next, in the mobile phone of the embodiment, a user can freely select an action for displaying a general menu for selecting a desired function or an action for activating an application program corresponding to an event at the time of an unlock operation during the screen lock mode.

Figure 8:
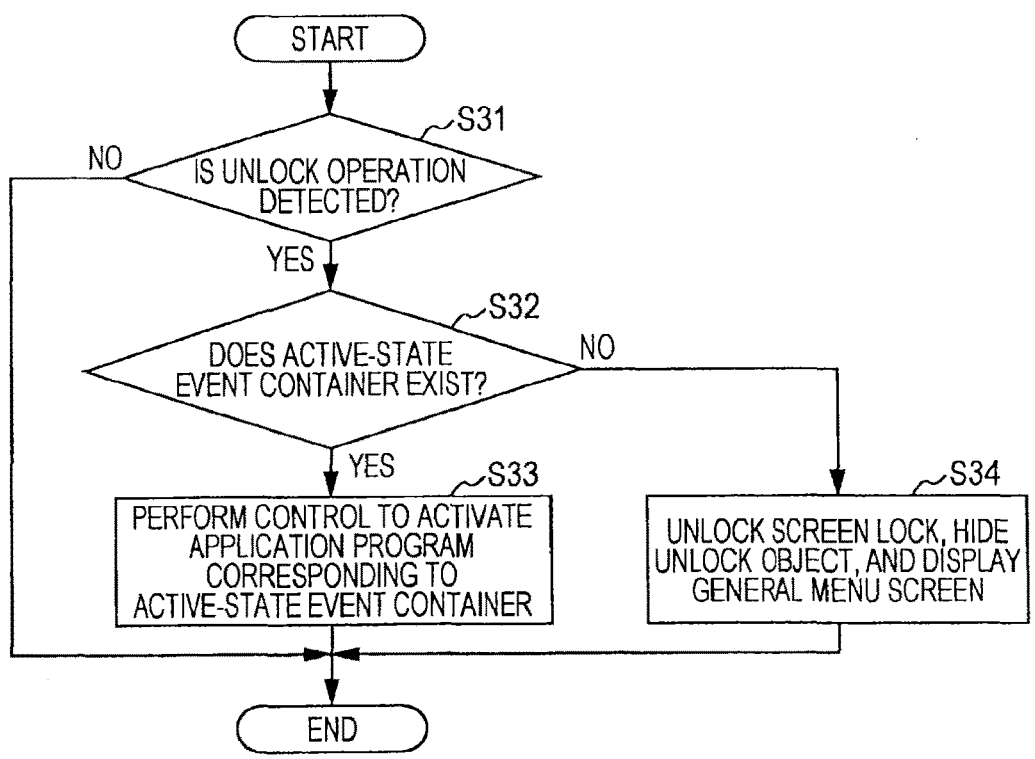
FIG. 8 is a flowchart for describing a difference between an action in response to an unlock operation performed using a software key when an active-state event container exists and an action in response to the unlock operation performed using the software key when no active-state event container exists during the screen lock mode of the mobile phone serving as the embodiment.
Figure 9A:
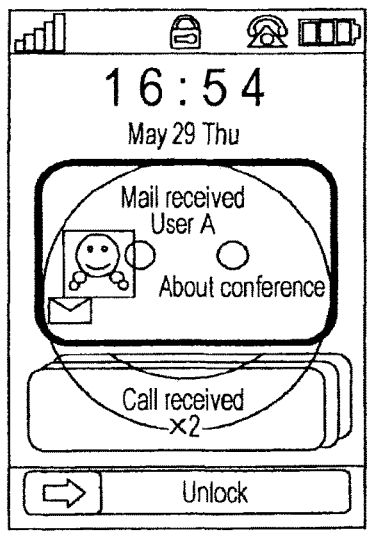
FIGS. 9A, 9B, 9C, and 9D are diagrams illustrating a state in which, when an unlock operation is performed during the screen lock mode of the mobile phone serving as the embodiment with an active-state event container existing, an application program corresponding to the event container is automatically activated.
Figure 9B:
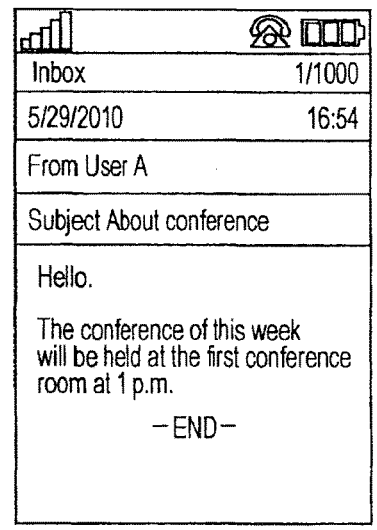
Figure 9C:
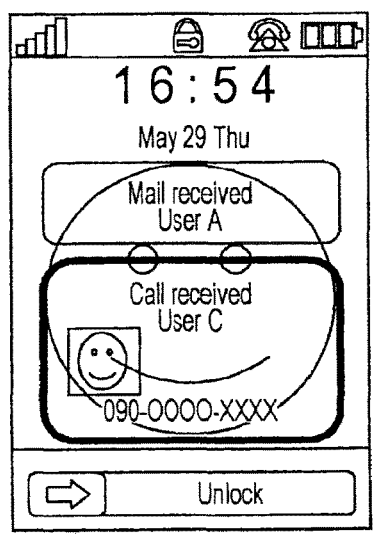
Figure 9D:
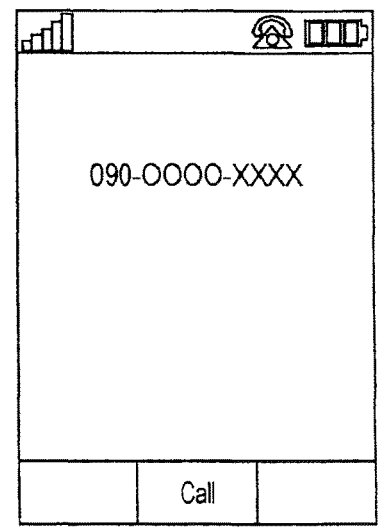

A flowchart of FIG. 8 illustrates a flow of such an action of the mobile phone at the time of an unlock operation. Once the user sets the screen lock mode, the control unit 15 starts processing of this flowchart of FIG. 8 on the basis of the screen lock control program stored in the memory 14.

As described above, upon shifting into the screen lock mode, the control unit 15 displays the unlock character (UNLOCK) and the arrow object (the unlock object) indicating the operation direction corresponding to the unlock operation at the lower area of the display screen of the display unit 5 as illustrated in FIG. 2(*a*).

These unlock character and unlock object mean that, if the user performs a slide operation (=the unlock operation) on the arrow unlock object in the direction of the arrow, screen lock is canceled and a touch operation can be freely performed on the display screen.

In STEP S31 of the flowchart of FIG. 8, the control unit 15 monitors presence or absence of an unlock operation of the unlock object. Once the control unit detects this unlock operation, the process proceeds to STEP S32.

In STEP S32, the control unit 15 determines whether an active-state event container exists among event containers currently displayed on the display unit 5 or not. If the control unit 15 determines that the active-state event container exists, the process proceeds to STEP S33. Additionally, if the control unit 15 determines that the active-state event container does not exist, the process proceeds to STEP S34.

An unlock operation performed with the active-state event container existing means that a request for displaying entire information corresponding to an event, which is currently in the active state and whose information partially displayed, is made.

Accordingly, if the process proceeds to STEP S33 because the control unit 15 detects the unlock operation with the active-state event container existing, the control unit cancels the screen lock, controls loading and activation of an application program corresponding to the event of the active-state event container from the memory 14, and terminates the processing of this flowchart of FIG. 8.

Thereafter, processing of the active-state event is performed on the basis of the activated application program.

More specifically, upon detecting an unlock operation when an event container of an email reception event is in the active state and a preview object of the received email is displayed as illustrated in, for example, FIG. 9(*a*), the control unit 15 controls activation of the email management program from the memory 14. The control unit 15 then processes data of the active-state email on the basis of this email management program and performs displaying of reception date and time, a user name of a transmission source, a subject, and a text body as illustrated in FIG. 9(*b*).

Similarly, upon detecting an unlock operation when an event container of a call reception event is in the active state and a preview object of the received call is displayed as illustrated in, for example, FIG. 9(*c*), the control unit controls activation of the communication program from the memory 14. The control unit 15 then displays a transmission ready screen corresponding to the active-state call event container and performs processing for transmitting a call after waiting a transmission operation of the user on the basis of this communication program.

As described above, upon detecting an unlock operation when one of event containers is in the active state, the mobile phone of the embodiment automatically activates an application program corresponding to the active-state event container and performs processing of an event corresponding to the event container.

On the other hand, an unlock operation performed with no event container being in the active state means that a user is making a request to cancel the currently set screen lock mode and freely operate the mobile phone.

Figure 10A:
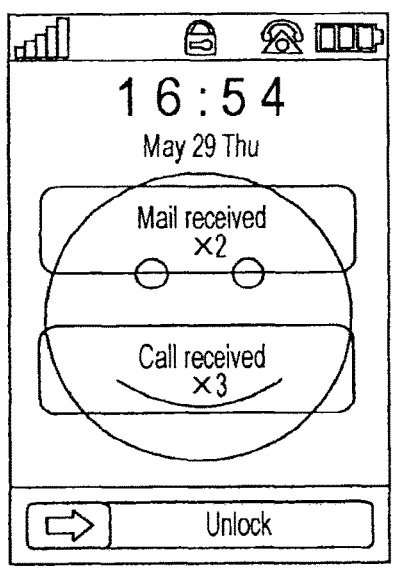
FIGS. 10A and 10B are diagrams illustrating a state in which a general menu is displayed when the unlock operation is performed during the screen lock mode of the mobile phone serving as the embodiment with no active-state event container existing.
Figure 10B:

Accordingly, if the process proceeds to STEP S34 because the control unit 15 detects an unlock operation when all event containers are in the inactive state as illustrated in FIG. 10(*a*), the control unit cancels the screen lock, hides the unlock object, controls displaying of a general menu for selecting a desired function on the display unit as illustrated in FIG. 10(b), and terminates the processing of this flowchart of FIG. 8.

[Operation for Selecting Desired Action at Timing of Unlock Operation Using Hardware Key]

Next, although an unlock operation of the screen lock mode is performed by operating an unlock object that is a software key displayed on the display unit 5 in the above-described example, the screen lock mode may be set and canceled by providing the hardware key 6 illustrated in FIG. 1 at a casing of the mobile phone and operating this hardware key 6.

More specifically, upon detecting an operation on the hardware key 6 without the screen lock mode being set, the control unit 15 sets the screen lock mode. Additionally, upon detecting an operation on the hardware key 6 with the screen lock mode being set, the control unit cancels the screen lock mode.

Figure 11:
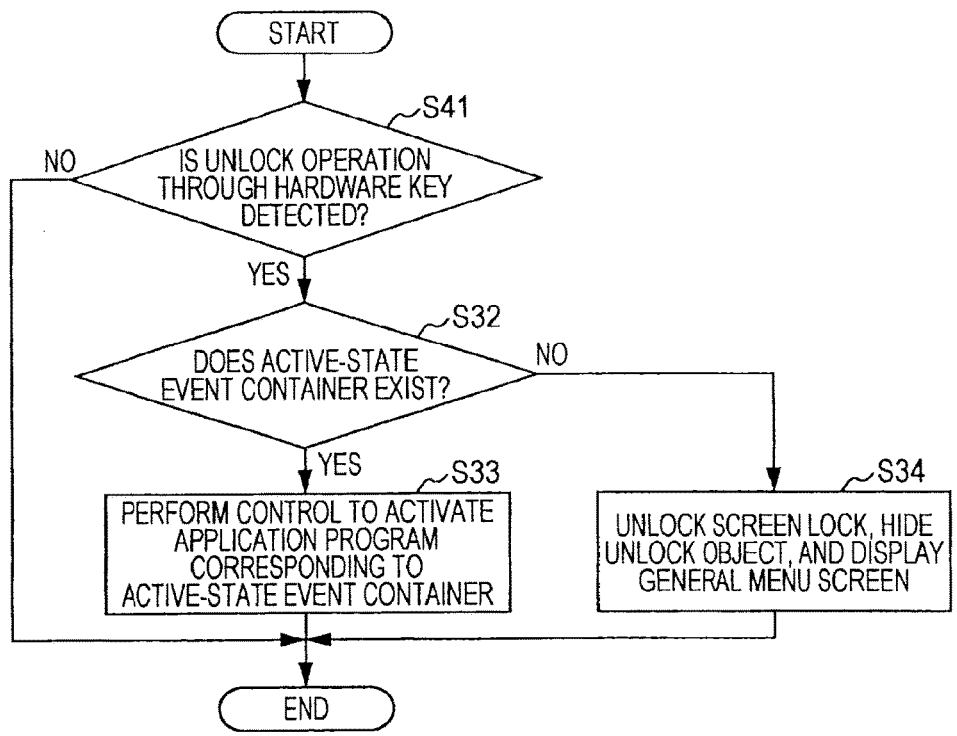
FIG. 11 is a flowchart for describing a difference between an action in response to an unlock operation performed using a hardware key when an active-state event container exists and an action in response to the unlock operation performed using the hardware key when no active-state event container exits during the screen lock mode of the mobile phone serving as the embodiment.
Figure 12A:
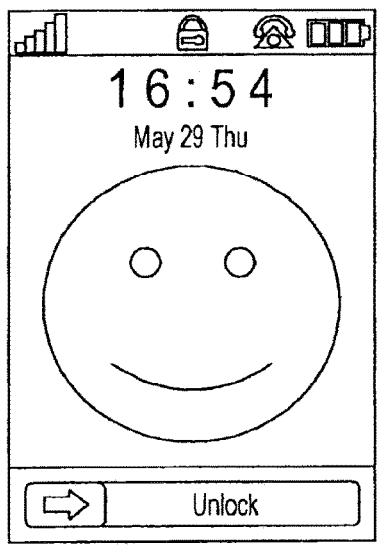
FIGS. 12A, 12B, 12C, and 12D are diagrams illustrating display examples during a screen lock mode of a conventional mobile phone.
Figure 12B:
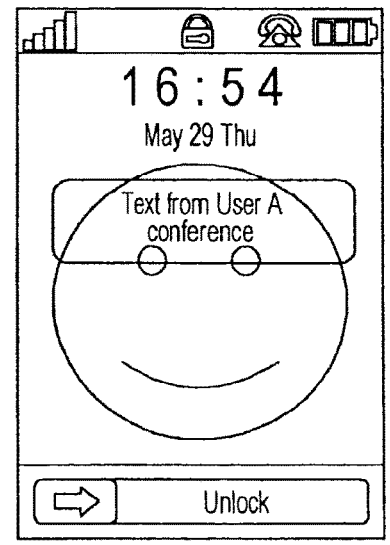
Figure 12C:
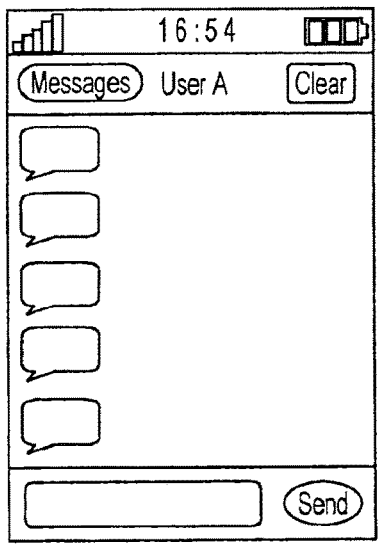
Figure 12D:

A flowchart of FIG. 11 illustrates a flow of an action of the mobile phone at the time of such an unlock operation using the hardware key 6. Once the user sets the screen lock mode, the control unit 15 starts processing of this flowchart of FIG. 11 on the basis of the screen lock control program stored in the memory 14.

In STEP S41 of the flowchart of FIG. 11, the control unit 15 monitors presence or absence of an unlock operation through the hardware key 6. In response to detection of this unlock operation, the process proceeds to STEP S32.

In STEP S32, the control unit 15 determines whether an active-state event container exists among event containers currently displayed on the display unit 5. If the control unit 15 determines that the active-state event container exists, the process proceeds to STEP S33. Additionally, if the control unit 15 determines that the active-state event container does not exist, the process proceeds to STEP S34.

An unlock operation performed with the active-state event container existing means that a request for displaying entire information for an event, which is currently in the active state and whose information is only partially displayed, is made.

Accordingly, if the process proceeds to STEP S33 because the control unit 15 detects the unlock operation with the active-state event container existing, the control unit cancels the screen lock mode and controls loading and activation of an application program corresponding to an event of the active-state event container from the memory 14. The control unit then terminates the processing of this flowchart of FIG. 11. Thereafter, processing of the event having been in the active state is performed on the basis of the activated application program.

On the other hand, an unlock operation performed with no event container being in the active state means that a user is making a request to cancel the currently set screen lock mode and freely operate the mobile phone.

Accordingly, if the process proceeds to STEP S34 because the control unit 15 detects the unlock operation with all of the event containers being in the inactive state, the control unit cancels the screen lock, hides the unlock object, and controls displaying of a general menu for selecting a desired function on the display unit. The control unit then terminates the processing of this flowchart of FIG. 11.

[Advantages of Embodiment]

As is apparent from the above description, an action of the mobile phone of this embodiment for each operation during the screen lock mode is defined in a following manner.

1. When a tap operation is performed on an inactive-state event container during the screen lock mode, a preview object displaying only partial information of an event corresponding to the tap-operation performed event container is formed while respecting that the screen lock is not canceled. This preview object is then displayed as an active-state event container of the tap-operation performed event container on the display unit 5 (see FIG. 7(a)-FIG. 7(c)).

2. When a tap operation is performed on an active-state event container during the screen lock mode, this event container is set back to an inactive state and displayed (see FIG. 7(a)-FIG. 7(c)).

3. When an unlock operation of the screen lock mode is detected in a case where an active-state event container is displayed during the screen lock mode, the screen lock mode is canceled and an application program corresponding to the active-state event container is activated. Processing of an event of the active-state event container is then performed on the basis of this activated application program (see FIG. 9(a)-FIG. 9(d)).

4. When an unlock operation is performed with all event containers being in the inactive state during the screen lock mode, the screen lock is canceled and a general menu for selecting a desired function is displayed on the display unit 5 (see FIG. 10(a) and FIG. 10(b)).

Since the action of the mobile phone of the embodiment for each operation during the screen lock mode is clearly defined in this manner, users can intentionally select and operate a desired action even during the screen lock mode.

Additionally, when an event container is set in the active state during the screen lock mode, the mobile phone of the embodiment displays a preview object displaying only partial information of this event on the display unit 5. This can prevent inconvenience of displaying entire information of the event without the screen lock being canceled. Accordingly, it is possible to perform displaying of information in a form of respecting the meaning of the existence of the screen lock mode.

[Alterations]

Although the above-described embodiment is an example applied to a mobile phone, the present invention can be applied to other electronic devices, such as, for example, a PHS (PHS: Personal Handyphone System), a PDA (PDA: Personal Digital Assistant), a portable game machine, a music player, a notebook personal computer in addition to this mobile phone. In either case, the same advantages as those of the above-described embodiment can be obtained.

Lastly, the above-described embodiment is an example. Accordingly, the claimed invention is not limited to the above-described embodiment and various modifications, combinations, and other embodiments may occur depending on design or other factors as long as they are within a range of claims of the present invention or equivalence of the claims. This should be naturally understood by the skilled in that art.

REFERENCE SIGNS LIST

1 antenna, 2 communication circuit, 3 speaker unit, 4 microphone unit, 5 display unit (touch panel), 6 hardware key, 7 light emitting unit (LED: Light Emitting Diode), 8 camera unit, 9 vibration unit, 10 timer, 11 acceleration sensor, 12 GPS antenna, 13 GPS unit, 14 memory, 15 control unit

What is claimed is:

1. An electronic device comprising:
   a touch panel display; and
   circuitry configured to
      detect a first event;

detect a second event:

control the touch panel display to display a first event object corresponding to the detected first event while a screen lock is set:

control the touch panel display to display a second event object corresponding to the detected second event while the screen lock is set;

detect a user operation to select the displayed first event object while the screen lock is set, wherein the user operation is a tap operation performed on the displayed first event object on the touch panel display to select the displayed first event object:

detect an unlocking operation for the screen lock;

in a case where the first event object is selected from among the first event object and the second event object displayed on the touch panel display by the tap operation on the touch panel display while the screen lock is set, set the selected first event object to be in an active state, wherein in a case where the first event object is set to be in the active state, the circuitry unlocks the screen lock and performs automatic activation and display of an application program corresponding to the first event in response to the unlocking operation being detected within a predetermined time since the first event object was selected by the user; and in a case where (1) the first event object is selected from among the first event object and the second event object displayed on the touch panel display by the tap operation on the touch panel display while the screen lock is set, and (2) the predetermined time has elapsed since the first event object was selected by the user without the unlocking operation being performed, set the selected first event object to be in an inactive state, wherein in a case where the first event object is set to be in the inactive state, the circuitry unlocks the screen lock without performing the automatic activation and display of the application program corresponding to the first event in response to the unlocking operation being detected after the predetermined time has elapsed since the first event object was selected by the user.

2. The electronic device according to claim 1, wherein
the detected first event is reception of an electronic message, and
the circuitry is configured to control display of partial information that includes information regarding a subject of the electronic message.

3. The electronic device according to claim 1, wherein
the detected first event is reception of a phone call, and
the circuitry is configured to control display of partial information that includes information regarding a phone number of the source of the phone call.

4. The electronic device according to claim 1, wherein the circuitry is configured to control display of an image of a user corresponding to a source of the detected first event.

5. The electronic device according to claim 1, wherein the circuitry is configured to cancel display of the first event object in response to an input from the user.

6. The electronic device according to claim 1, further comprising:
a hardware key, wherein
the circuitry is configured to detect an operation on the hardware key and recognize the operation on the hardware key as the unlocking operation for the screen lock.

7. A method, implemented by an electronic device including a touch panel display and a hardware key, comprising:
detecting a first event;
detecting a second event;
controlling, using circuitry, the touch panel display to display a first event object corresponding to the detected event while a screen lock is set;
controlling, using the circuitry, the touch panel display to display a second event object corresponding to the detected second event while the screen lock is set;
detecting a user operation to select the displayed first event object while the screen lock is set, wherein the user operation is a tap operation performed on the displayed first event object on the touch panel display to select the displayed first event object;
detecting an operation on the hardware key and recognize the operation as an unlocking operation for the screen lock;
in a case where the first event object is selected from among the first event object and the second event object displayed on the touch panel display by the tap operation on the touch panel display while the screen lock is set, setting the selected first event object to be in an active state, wherein
in a case where the first event object is set to be in the active state, the circuitry unlocks the screen lock and performs automatic activation and display of an application program corresponding to the first event in response to the unlocking operation being detected within a predetermined time since the first event object was selected by the user; and
in a case where (1) the first event object is selected from among the first event object and the second event object displayed on the touch panel display by the tap operation on the touch panel display while the screen lock is set, and (2) the predetermined time has elapsed since the first event object was selected by the user without the unlocking operation being performed, setting the selected first event object to be in an inactive state, wherein
in a case where the first event object is set to be in the inactive state, the circuitry unlocks the screen lock without performing the automatic activation and display of the application program corresponding to the first event in response to the unlocking operation being detected after the predetermined time has elapsed since the first event object was selected by the user.

* * * * *